United States Patent [19]

Salvagnini

[11] Patent Number: 4,856,178

[45] Date of Patent: Aug. 15, 1989

[54] MACHINE TOOL FOR TURNING, MILLING, BORING, DRILLING, AND WASHING WITH INDEPENDENT MEANS FOR CLAMPING THE PART TO BE MACHINED

[75] Inventor: Guido Salvagnini, Sarego, Italy

[73] Assignee: SZ s.r.l., Sarego, Italy

[21] Appl. No.: 201,401

[22] Filed: Jun. 2, 1988

[30] Foreign Application Priority Data

Jun. 9, 1987 [IT] Italy .................. 20825 A/87

[51] Int. Cl.⁴ .................. B23Q 3/157; B23P 23/02
[52] U.S. Cl. .................. 29/568; 29/27 A; 82/129; 408/38; 408/39
[58] Field of Search .................. 29/26 A, 27 R, 27 C, 29/27 A, 568, 36, 34, 40, 50, 53, 26 R, 564; 409/235, 217, 203, 158, 240, 165, 166, 163; 82/2.5, 3, 2 R; 408/38, 39, 40, 42, 36; 414/736

[56] References Cited

U.S. PATENT DOCUMENTS

| | | | |
|---|---|---|---|
| 1,826,867 | 10/1931 | Domizi | 408/39 |
| 2,051,720 | 8/1936 | Kingsbury | 408/38 |
| 2,548,188 | 4/1951 | Armitage et al. | 29/27 R |
| 2,803,840 | 8/1957 | McShirley | 29/39 X |
| 3,303,727 | 2/1967 | Hackbarth et al. | 408/38 |
| 4,352,611 | 10/1982 | Goldraikh et al. | 408/37 |
| 4,404,727 | 9/1983 | Zankl | 29/568 |
| 4,409,869 | 10/1983 | Berly | 82/2 R |
| 4,457,193 | 7/1984 | Matthey | 82/3 |
| 4,597,144 | 7/1986 | Frank et al. | 29/40 |
| 4,646,422 | 3/1987 | McMurtry | 414/736 |
| 4,704,773 | 11/1987 | Quinart et al. | 29/27 C |
| 4,739,684 | 4/1988 | Brown et al. | 29/27 R |
| 4,777,713 | 10/1988 | Kitamura | 29/568 |

FOREIGN PATENT DOCUMENTS

| | | | |
|---|---|---|---|
| 32890 | 7/1981 | European Pat. Off. | 29/568 |
| 654237 | 2/1986 | Switzerland | 29/568 |
| 914237 | 3/1982 | U.S.S.R. | 29/41 |
| 1196208 | 12/1985 | U.S.S.R. | 29/568 |

Primary Examiner—William Briggs
Attorney, Agent, or Firm—Cushman, Darby & Cushman

[57] ABSTRACT

A machine is accomplished comprising two pairs of operating heads in which each pair includes two identical operating heads essentially opposite to each other equipped with chucks rotating on horizontal axes having at one end a conical housing for receiving a tool.

Each head can be moved longitudinally and vertically and the corresponding conical housing faces a central cavity.

A machining tool or a clamping tool for holding the part to be machined can be inserted into each housing, so that one or two opposite chucks support the part while it is machined by the tool or by the tools inserted into one or more of the remaining chucks.

6 Claims, 5 Drawing Sheets

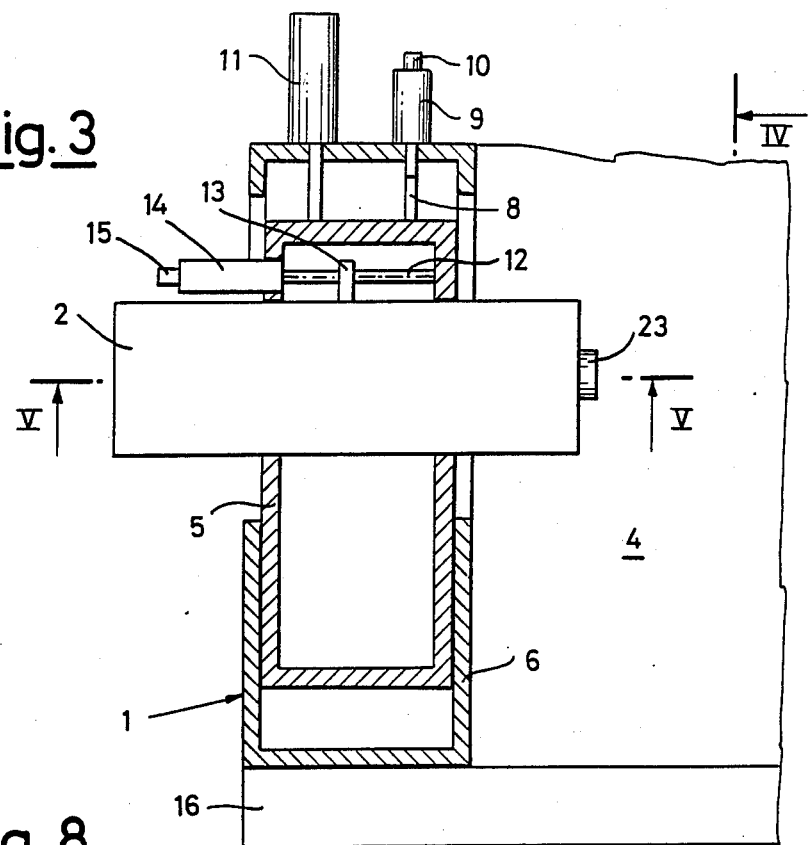
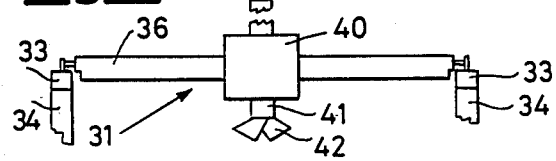
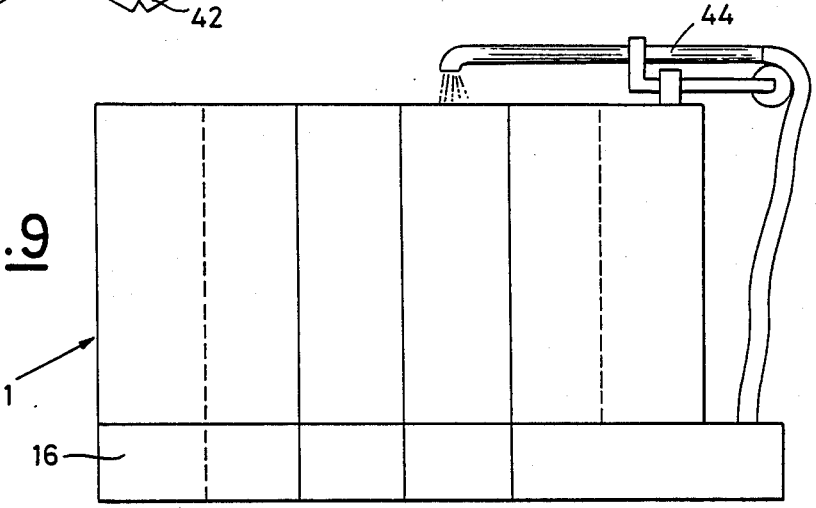

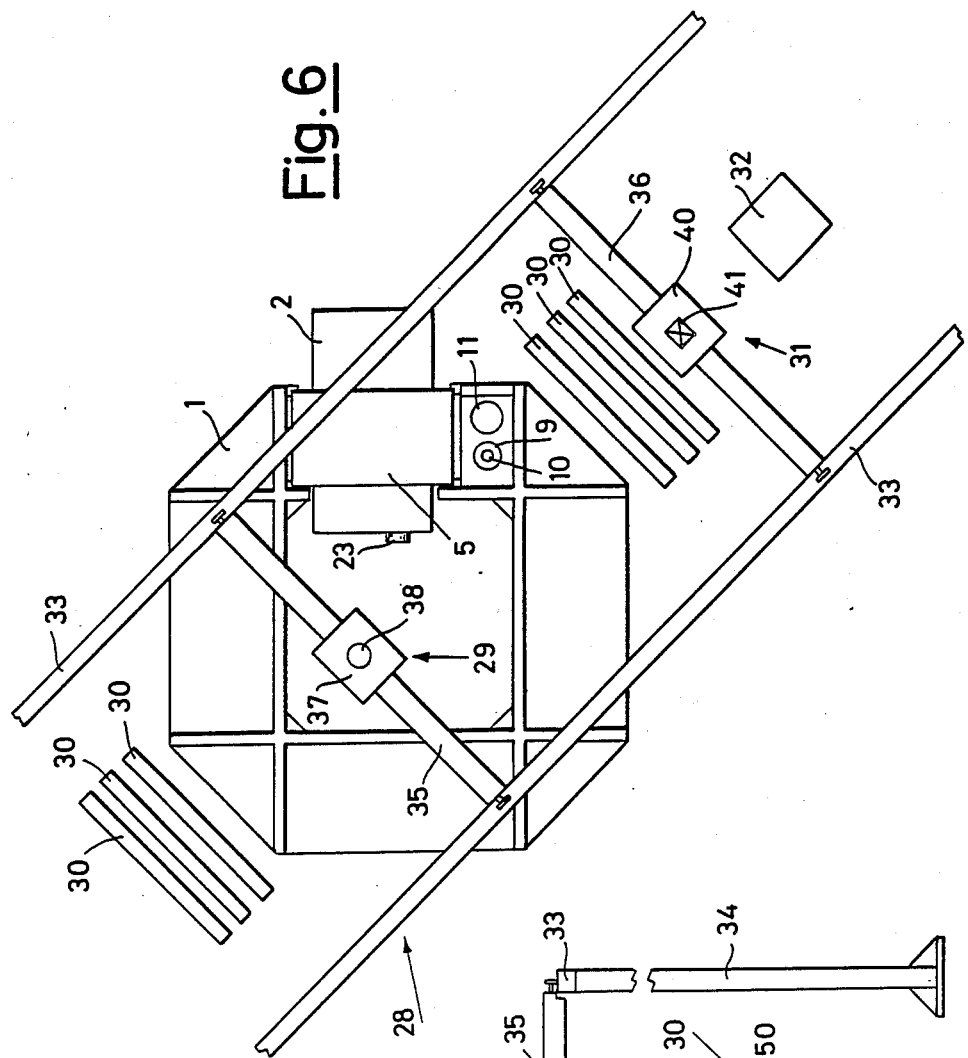

MACHINE TOOL FOR TURNING, MILLING, BORING, DRILLING, AND WASHING WITH INDEPENDENT MEANS FOR CLAMPING THE PART TO BE MACHINED

DESCRIPTION

The current invention refers to a machine tool for turning, milling, boring, drilling and washing with independent means for clamping the part to be machined.

Generally the operations of turning (the part rotates and the tool does not) and the operations of milling or drilling (the part does not rotate and the tool does) are executed on distinct machines, with very different architectures. Some machines which execute prevalently turning operations may also execute drilling and milling operations, but these latter operations require an amount of power which is much lower than that required for turning. In addition, for drilling and milling operations the part must be held in position by clamping fixtures mounted on separate movable tables or pallets, specifically designed and manufactured, which must withstand the cutting force of the tool and which also prevent access to some of the areas to be machined. Lastly, once the drilling and milling operations are finished, the chips remain attached to the part and to the fixture in almost inaccessible niches and holes, so that a subsequent washing operation is required in a separate machine.

In all prevalently turning machines the chuck only has the function of holding the part and rotating it by transferring power to it, while another non-rotating tool machines it; at most the chuck may hold the part in a given fixed angular position, while it is machined by a small rotating tool moved by a chuck with less power. It is not, however, possible to equip the main chuck of the lathe with a rotating tool and use it to machine the part supported by other organs. In addition, a portion of the two end faces of the part, which are at right angles to the rotation axis, are always inaccessible to both rotating and non-rotating tools.

On the other hand the chuck of milling and boring machines can carry only one rotating tool, while the part is placed directly on to the machine's table and is fixed to it by appropriate brackets or is fastened to fixtures in turn fixed to the table and fastened to it by appropriate brackets. The table, the fixture and the brackets make some portions of the part inaccessible to the tool. Means have never been accomplished for the chuck of a milling or boring machine to be integral with the part being machined and then to rotate it while a non-rotating tool machines it.

Very frequently the same part must be subjected to turning and drilling/boring operations and with the current state of the art it must therefore be moved in sequence to different machines (lathe, drilling/boring machine, washing machine) which are separately programmed and requires special fixtures, whose design and manufacture delay the start of production.

In view of this state of the art, the object of the present invention is to accomplish a machine tool which can execute operations of turning, milling, boring, drilling and washing on a part without the need for movable tables and locking members equipped with their own operation means for clamping and supporting the parts being machined.

According to the invention, said object is attained by a machine tool characterized in that it includes two pairs of identical operating heads with chucks rotating on horizontal axes, the chucks of each pair having their axes in a first vertical plane and the chucks of the second pair having their axes in a second vertical plane perpendicular to the first, each head being movable along the horizontal axis of its own chuck and a vertical direction, each chuck having at its end a housing for alternately receiving an operating tool or a tool for clamping the part to be machined, said housings facing towards a central cavity surrounded by said operating heads.

With such a configuration, at any given instant the machine has four tools at its disposal of which at least one is a clamping tool with surfaces which conjugate with complementary surfaces previously obtained on the part to be machined, while the others may be appropriate tools for machining (turning, milling, boring, drilling) the part itself.

If the tool which clamps the part is stationary, and the other tools do the machining, the machine operates as a milling or boring machine.

If, on the other hand, the tool clamping the part rotates and moves axially while the others are stationary, the machine operates as a lathe.

During the period of time when one or more given clamping tools are in operation, one or more machining tools may prepare the surfaces on the part which are to conjugate with the holding tools which will replace those currently in use to receive the part and support it during the machining operations on the surfaces which were previously inaccessible.

With this system the part being machined is held by nothing other than by clamping tools, thus doing away with the need for the currently-used supporting table and additional handling tables.

The clamping tools required by this machine can be purely static and can grasp the part under the action of the chucks, as opposed to the usual clamping tools, which are articulated and require an independent action.

The machine tool is preferably equipped with a system for washing the machined part, said system including means for feeding an appropriate detergent liquid in the central cavity where the part is held and rotated at the end of the machining cycle and means for collecting the used liquid and for the evacuation of the chips.

In this way the part does not have to be moved to a special washing machine, simplifying the traffic of the parts and the operation of the production system.

One possible embodiment of the present invention is illustrated, as a non-limiting example, in the enclosed drawings, in which:

FIG. 3 shows a detail of the above machine as a section along the line III—III of FIG. 2;

FIG. 6 shows a plan view from above of the above machine in combination with a frame for supporting a robot for placing tools and parts to be machined;

FIG. 7 shows a front view of a tool crib with the corresponding robot for changing the tools;

FIG. 8 shows a front view of the detail of the robot for placing the parts to be machined;

FIG. 9 shows the above machine during the washing phase of the machined part;

Figure 1:
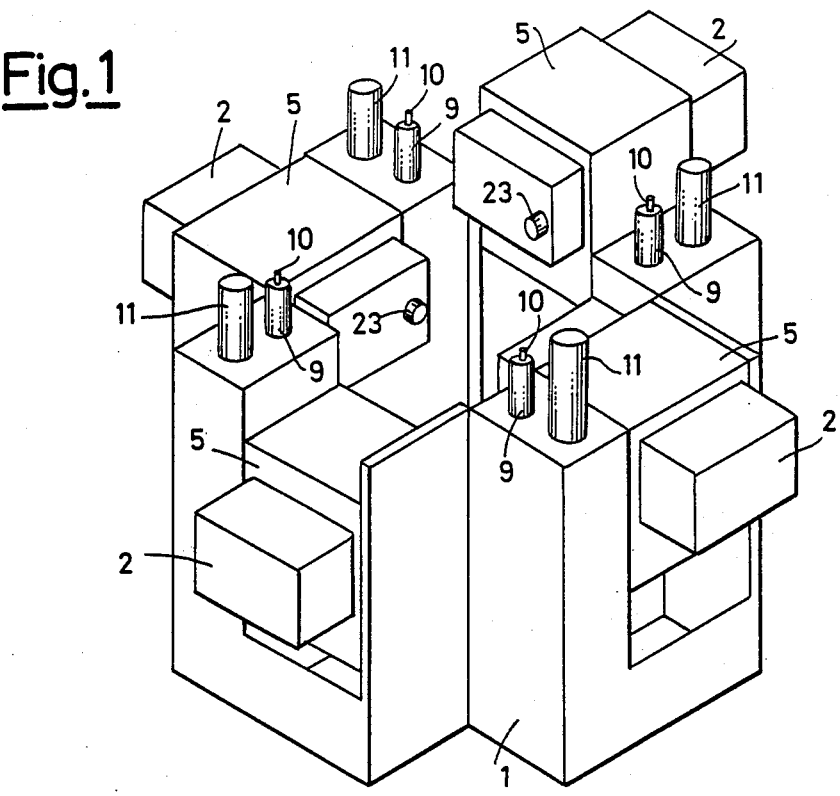
FIG. 1 shows a machine tool according to the invention is a perspective schematic view.

With reference to FIG. 1, this shows a machine tool for the machining of parts for turning, milling, boring and drilling, equipped with a base 1 in which two pairs of identical operating heads 2 are inserted at right angles to each another. Each pair has heads which are essentially opposed equipped with chucks 3 having at an end 23 a housing 48 in the shape of a truncated cone (FIG. 5) to receive a tool. The housing 48 contains a clamping organ 18 (FIG. 5) for holding a tool's tang.

Figure 2:
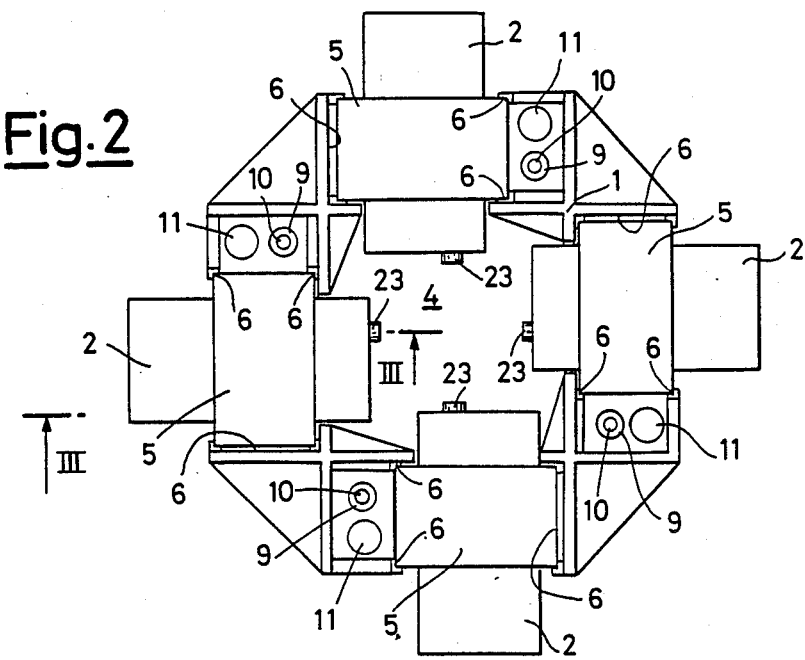
FIG. 2 shows the above machine tool in a plan view from above.

The operating heads 2 have the conical housings 48 of their chucks facing towards a central cavity (FIGS. 1 and 2) and can slide in the direction of the axis of their own chuck 3 in a cursor 5 which in turn slides along vertical guides 6 in the base 1.

Figure 4:
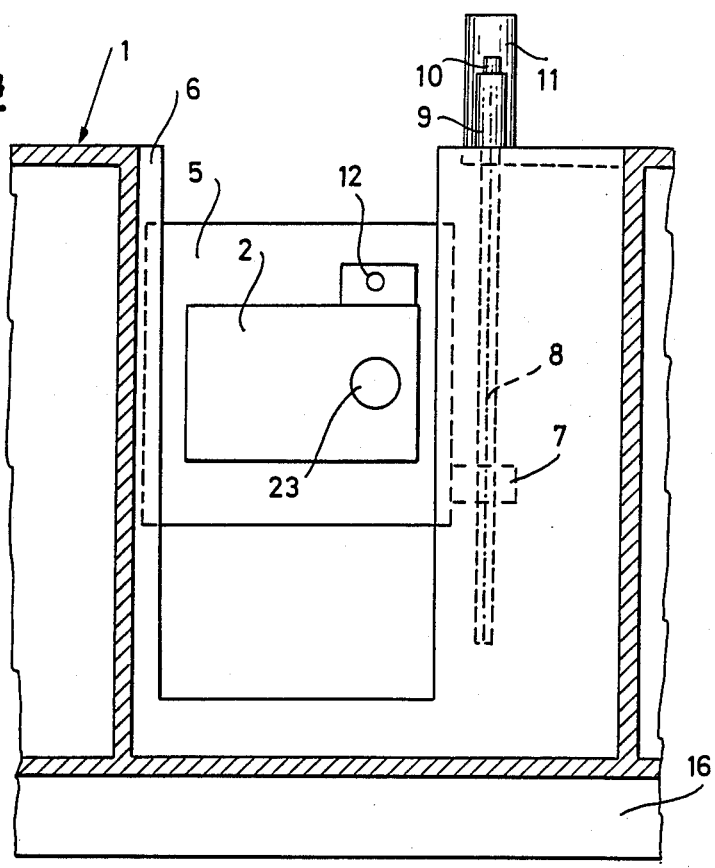
FIG. 4 shows the same detail of the above machine as a section along the line IV—IV of FIG. 3.

The cursor 5 is integral by means of an internally threaded sleeve 7 with a vertical screw 8 (FIG. 4) made to rotate by a motor 9 equipped with a sensor 10 which can transmit the position of the cursor 5 along the guides 6 to an operating and control system. The cursor 5 is raised by the screw 8 in co-operation with a fluid-filled cylinder 11 which acts as a counter weight.

Each operating head 2 is made to translate within the cursor 5 by means of a horizontal screw 12 inserted in a rotatable manner in a support 13 (FIG. 3), said screw 12 being operated by a motor 14 equipped with a sensor 15 which can transmit the position of the operating head 2 within the cursor 5 to an operating and control system.

The base 1 is placed (FIGS. 3 and 4) on a perimetral support 16, inside which there are the devices for recovering the lubrication, cooling and washing fluids, for recirculating such fluids and for separating the chips.

Figure 5:
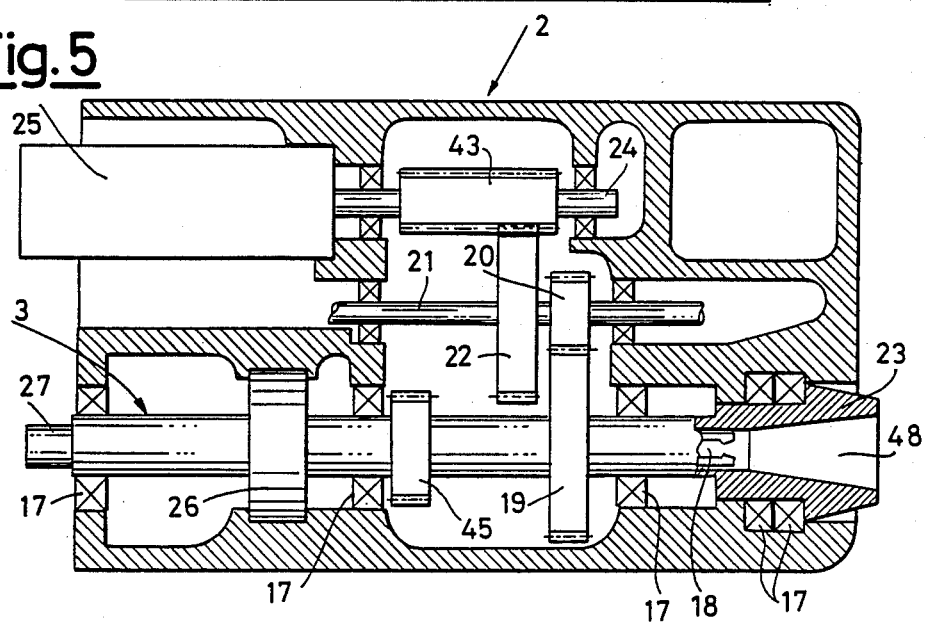
FIG. 5 shows a longitudinal section of an operating head included in the above machine, according to the line V—V of FIG. 3.

As shown in FIG. 5, each operating head supports, on bearings 17, the chuck 3 equipped with the corresponding clamping member for holding the tang of a tool placed in the housing 48 of the end 23.

The chuck 3 is operated by a system of gears, shown purely as an example, which includes a first toothed gear wheel 19 integral with said chuck 3, which engages with a second toothed gear wheel 20 rotating on a shaft 21 which supports a third toothed gear wheel 22 engaging a fourth toothed gear wheel 43 on the driving shaft 24 of a motor 25. A fifth toothed gear wheel 45 on the chuck 3 is used for changing the speed of rotation of the chuck 3. Such change of speed is obtained by the translation of the shaft 21 which engages said toothed wheel 45 with the toothed wheel 22. In addition the shaft 21 can also be positioned to that no gears are engaged.

The chuck 3 is equipped with a clutch brake 26 so that it can be locked in an accurate position. The chuck is also equipped, at the opposite end to that holding the clamping organ 18, with a sensor 27 which sends indication signals to the operating and control system regarding the angular position of said chuck 3.

The machine tool also includes a frame 28 supporting a first robot 29 which takes machining tools 50 and clamping tools 51 from one or more cribs 30 and places them in the housings 48 of the chucks 3 and executes the reverse operation and a second robot 31 which takes the parts to be machined from a storage area 32 and places them between the clamping tools 51 held in one or more of the chucks 3 and executes the reverse operation (FIG. 6).

Said frame 28 consists of a pair of guides 33, supported in a higher position above the machine tool by stanchions 34 (FIG. 7), on which guides 33 slide a first transversal element 35 supporting said first robot 29 and a second transversal element 36 supporting said second robot 31.

Said first robot 29, as shown in greater detail in FIG. 7, consists of a carriage 37 which in turn slides along said first transversal element 35, which carriage 37 supports a vertical arm 38 equipped at its lower end with a prehensile member 39 rotating on the axis of said vertical arm and on a horizontal axis.

Said second robot 31, as shown schematically in FIG. 8, consists of a carriage 40 sliding along said second transversal element 36 and equipped with an arm 41 which can move vertically and can also rotate on its own axis, having at its lower end a prehensile member 42 for taking and positioning the part to be machined between the clamping tools 51.

As shown as an example in FIGS. from 10 to 12, such clamping tools 51 can include a tang 52 which can engage with the clamping member 18 of each chuck 3, intermediate portions of couplings 53 and 54 and one or more engaging elements (57, 59–62) with a shape that is essentially complementary to the shape of cavity/edges or other projections which may already exist or may be about to be produced preliminarily in the part to be machined. The portion 53 can penetrate into the truncated cone-shaped housing 48 of the end 23 of a chuck 3.

Figure 10:
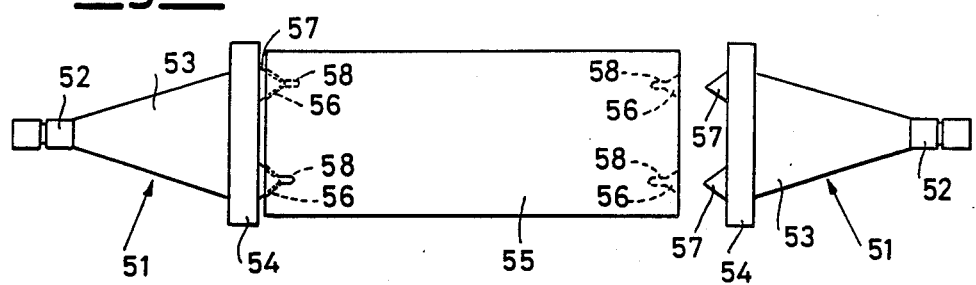
FIGS. 10, 11 and 12 show examples of clamping tools for the parts to be machined.

In FIG. 10 the part to be machined is a cylinder 55 on whose bases cavities 56 are produced with axial extensions 58, which can receive conically-shaped coupling elements 57 present on a pair of clamping tools and inserted by pressure in the above cavities 56.

Figure 11:
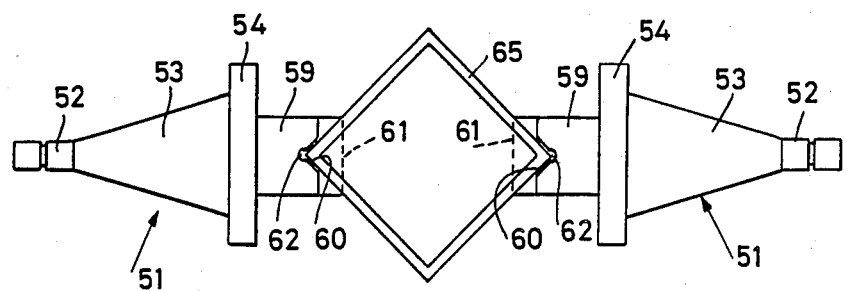
Figure 12:
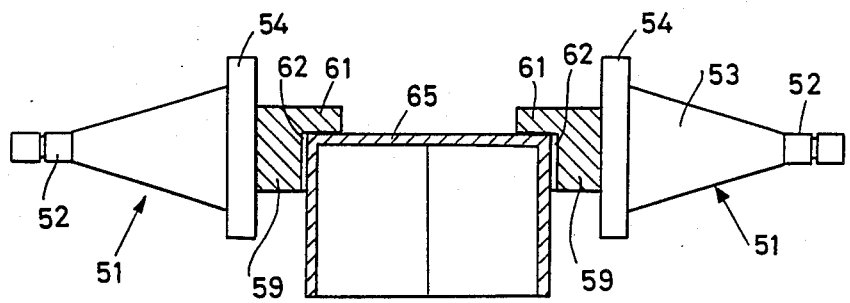

FIGS. 11 and 12 show another example of a part to be machined and the corresponding clamping tool 51. In this case the coupling elements are small blocks 59 equipped with seats having a section in the shape of a right-angle triangle 60 for holding a part with a square outline such as a box 65.

As shown in FIG. 12, the small blocks 59 are equipped with a support 61 which sustains the box 65 before clamping takes place. The tools are also rotated so that machining can be executed on all the surfaces of the box 65. In FIG. 12 the box is shown upside down and is held by the friction generated by the close contact of the box's walls with the seats 60 of the small blocks 59. Said seats have cylindrical cavities 62 arranged so as to allow the housing of the edges of the box 65 so that said edges are not deformed.

The described machine tool also includes a system for washing the machined part (FIG. 9) comprising a movable hose 44 which can be positioned above the cavity 4 to deliver a quantity of washing liquid on a machined part which has been made to translate and rotate at a higher or lower speed by the chucks 3 holding it.

The used washing liquid is collected by a recovery device inside the lower part of the machine.

The machine tool described above operates as follows.

The loading of the part to be machined is executed by the loading and unloading robot 31, taking from the area 32 the rough part which has been previously machined by an auxiliary machine so as to obtain a few surfaces (planes, cylinders, cones, threads, etc.) which can engage with the prehensile members 42 of the same robot 31 and with the clamping tools 51 previously engaged with one or more chucks 3. Said robot 31, controlled by the computer governing the entire machine, having been previously informed by the operator or directly by the auxiliary preparation machine on the nature of the sustaining surfaces, moves its clamping member 42 to the prescribed position of pad 32, takes the rough part, positions it over the space 4, lowers it to the prescribed level, orients it so that the corresponding clamping surfaces are opposite to each other with the simple horizontal movement of an operating head 2, or of two opposite operating heads, and abandons it as soon as those conjugated surfaces are actually in contact and have been subjected to the prescribed clamping forces, which must be different according to the weight and the rigidity of the part and to the nature of the machining operation.

The following are examples of the operations which the machine described here can execute:

one or more robots 29 used for changing the tools insert machining tools 50 into the two or three chucks 3 which are not used for supporting the part; the chuck or the two opposite chucks which support the part are rotated at a high speed and moved in an axial translation in the case of turning operations, or at a low speed along one or more of the controlled axes in the case of milling or similar operations; the machining tools execute the movements prescribed by the machining programme which are compatible with the initial clamping position; during this part of the machining cycle the tools may be replaced by the corresponding robot; additional machining operations which are incompatible with the initial clamping position are carried out after the clamping has been executed by one or more new clamping tools which a robot has in the meantime inserted into one or more chucks not previously engaged in a supporting role and operating on machined surfaces, possibly for this specific purpose, during the previous clamping position.

In some cases involving heavy milling machine or such like operations the chuck engaged in supporting the parts must be perfectly stationary in the angular position prescribed by the programme in spite of the large forces applied to them; this is the reason for the clutch brakes 26. When two opposite chucks are used for supporting a part, one is driving and the other is driven: so as not to also rotate the motor 25 of the driven chuck, the transmission has an idle state.

The washing operation, which must be executed at the end of the machining cycle and before the unloading cycle, is executed by the device pumping the detergent liquid after the hose 44 has been inserted into the space 4, while the part rotates and moves slowly and is possibly subjected to high accelerations.

In a similar manner the same robot unloads the finished, washed and oriented part by penetrating into the space 2, clamping the part at the reference points already used for loading the part, or, if these have been eliminated, at the new reference points machined during the cycle, retracting it from the space 2 as soon as the last clamping tool or tools have abandoned it and depositing it in the drying area.

I claim:

1. A machine tool comprising two pairs of identical operating heads with chucks rotating on horizontal axes, the chucks of the first pair having their axes in a first vertical plane and the chucks of the second pair having their axes in a second vertical plane perpendicular to the first, each head being movable along the horizontal axis of its chuck and in a vertical direction, each chuck having at its end a housing for alternately receiving an operating tool or a tool for clamping the part to be machined, said housings facing towards a central cavity surrounded by said operating heads.

2. A machine according to claim 1 wherein each operating head is connected to means for horizontal translation in the direction of the axis of its own chuck and to means for vertical translation.

3. A machine according to claim 1 wherein each operating head includes means for rotating the corresponding chuck and means for locking the chuck itself in a fixed position.

4. A machine according to claim 1 further including sensors for signalling the above machine's operating and control system the positions of the chucks of said heads with respect to a predetermined reference system.

5. A machine according to claim 1 further including at least a first robot to position and take from the housings of the chucks and from one or more cribs the machining tools and the clamping tools for the part to be machined and at least a second robot to position the parts to be machined between said clamping elements and to take them away after the machining operations have been executed.

6. A machine according to claim 1 further including a washing device which can penetrate into said cavity and deliver a quantity of detergent liquid on to the machined part, the used detergent liquid being piped to a collection device inside the lower part of said machine.

* * * * *